(12) United States Patent
Buchholz et al.

(10) Patent No.: US 8,093,176 B2
(45) Date of Patent: Jan. 10, 2012

(54) PROCESS FOR THE CONTINUOUS PRODUCTION OF CATALYSTS

(75) Inventors: Sigurd Buchholz, Köln (DE); Volker Michele, Köln (DE); Leslaw Mileczko, Dormagen (DE); Christian Münnich, Köln (DE); Reiner Rudolf, Leverkusen (DE); Aurel Wolf, Essen (DE)

(73) Assignee: Bayer MaterialScience AG, Leverkusen (DE)

( * ) Notice: Subject to any disclaimer, the term of this patent is extended or adjusted under 35 U.S.C. 154(b) by 548 days.

(21) Appl. No.: 11/673,878

(22) Filed: Feb. 12, 2007

(65) Prior Publication Data
US 2008/0003169 A1 Jan. 3, 2008

(30) Foreign Application Priority Data
Feb. 16, 2006 (DE) .......................... 10 2006 007 147

(51) Int. Cl.
*B01J 23/00* (2006.01)
*B01J 23/32* (2006.01)
*B01J 23/58* (2006.01)
*B01J 23/56* (2006.01)
*B01J 23/70* (2006.01)
*B01J 23/74* (2006.01)
*C01B 31/00* (2006.01)
*C01B 31/02* (2006.01)

(52) U.S. Cl. ........ 502/300; 502/324; 502/325; 502/328; 502/332; 502/338; 423/445 R; 977/742

(58) Field of Classification Search .......... 502/300–355; 423/445 R, 447.1–447.4
See application file for complete search history.

(56) References Cited

U.S. PATENT DOCUMENTS

| 4,499,209 A * | 2/1985 | Hoek et al. ............... 518/707 |
| 5,753,088 A * | 5/1998 | Olk ........................ 204/173 |
| 2004/0147373 A1* | 7/2004 | Haneburger ............... 482/54 |

FOREIGN PATENT DOCUMENTS

| DE | 10 2004 054 959 | 5/2006 |
| EP | 0205 556 | 6/1986 |
| EP | 0 200 315 A | 11/1986 |
| EP | 1 391 425 A1 | 2/2004 |
| WO | WO 86/03455 | 6/1986 |
| WO | 99 34917 A | 7/1999 |
| WO | 2007 006512 A | 1/2007 |

OTHER PUBLICATIONS

S. Iijima, Nature 354, 56-58, 1991.
De Jong et. al. Catal. Rev.-Sci. Eng., 42(4), 481-510, 2000.
Shamil' K. Shaikhutdinov, L.B. Avdeeva, O.V. Goncharova, D.I. Kochubey, B.N. Novgorodov, L.M. Plyasova, "Coprecipitated Ni-Al and Ni-Cu-Al catalysts for methane decomposition and carbon deposition I", Applied Catalysis A: General, 126, 1995, pp. 125-139.
Knozinger H, et al; "Heterogeneous catalysis and solid catalysts"; Ullmann's Encyclopedia of Industrial Chemistry, (2005).
Baldyga et al. "Turbulent Mixing and Chemical Reactions", John Wiley & Sons, Chapter 13, p. 805-813.

* cited by examiner

*Primary Examiner* — Stanley Silverman
*Assistant Examiner* — Anthony J Zimmer
(74) *Attorney, Agent, or Firm* — Norris McLaughlin & Marcus PA

(57) ABSTRACT

Process for the continuous production of catalysts which are useful for the production of carbon nanotubes by decomposition of gaseous carbon compounds.

5 Claims, 4 Drawing Sheets

PROCESS FOR THE CONTINUOUS PRODUCTION OF CATALYSTS

The invention relates to a new process for the continuous production of catalysts. These catalysts are used for the production of carbon nanotubes by decomposition of gaseous carbon compounds.

BACKGROUND OF THE INVENTION

By carbon nanotubes are understood principally cylindrical carbon tubes with a diameter between 3 and 80 nm, the length being a multiple, at least 10-fold, of the diameter. These tubes consist of layers of ordered carbon atoms and have a nucleus different in morphology. These carbon nanotubes are also referred to for example as "carbon fibrils" or "hollow carbon fibres" or "bamboo". Because of their dimensions and their particular properties, the carbon nanotubes described have an industrial importance for the production of composite materials. Other substantial possibilities are in electronics, energy and other applications.

Carbon nanotubes are a material known for some time. Although Iijima in 1991 (S. Iijima, Nature 354, 56-58, 1991) is generally referred to as the discoverer of nanotubes, these materials, in particular fibrous graphite materials with several graphite layers, have been known even longer.

The known methods for the production of carbon nanotubes include for example arc, laser ablation and catalytic processes. In many of these processes, carbon black, amorphous carbon and fibres with high diameters are formed as by-products. In the catalytic processes, a distinction can be made between deposition on supported catalyst particles and deposition on metal centres formed in situ with diameters in the nanometer range (so-called "flow process"). In production by the catalytic deposition of carbon from hydrocarbons gaseous under reaction conditions (hereafter CCVD—catalytic chemical vapour deposition), acetylene, methane, ethane, ethylene, butane, butene, butadiene, benzene and other educts containing carbon are named as possible carbon donors. For example, the production of carbon nanotubes by the decomposition of light (i.e. short- and medium-chain aliphatic or one- or two-nucleus aromatic) hydrocarbons on a catalyst based on iron at temperatures above 800-900° C. are described in EP 205 556 B1 and WO A 86/03455.

The catalysts usually used in the prior art (De Jong et. al. Catal. Rev.-Sci. Eng., 42(4), 481-510, 2000) as a rule contain metals, metal oxides or decomposable or reducible metal components such as e.g. Fe, Mo, Ni, V, Mn, Sn, Co, Cu and others.

The formation of carbon nanotubes and the properties of the tubes formed depend in a complex way on the metal component used as catalyst or a combination of several metal components, the support material used and the interaction between catalyst and support, the production method of the catalyst, the educt gas and partial pressure, an admixture of hydrogen or other gases, the reaction temperature and the dwell time or the reactor used. An optimisation is a particular challenge for an industrial process.

It should be noted that the metal component used in CCVD and referred to as catalyst is consumed in the course of the synthesis process. This consumption can be attributed to a deactivation of the metal component, e.g. because of deposition of carbon on the whole particle which leads to the complete covering of the particle (this is known to the skilled person as "encapping"). As a rule, a reactivation is not possible or economically not meaningful. Often only a maximum of a few grams of carbon nanotubes per gram of catalyst are obtained, the catalyst here comprising the whole of the support and catalytically active materials used. Because of the consumption of catalyst described, a high yield of carbon nanotubes based on the catalyst used is an essential requirement for catalyst and process.

For an industrial production of carbon nanotubes, e.g. as a constituent for improving the mechanical properties or conductivity of composite materials, as with all industrial processes a high space-time yield is to be strived for in obtaining the particular properties of the nanotubes and minimising the energy and materials to be used.

In EP 0205 556 A1 (Hyperion Catalysis International) is described the production of carbon nanotubes on iron-containing catalysts supported on alumina which have been produced by means of incipient wetness. The carbon nanotubes produced have, at 10-45 nm, a very broad distribution of the outer carbon nanotube diameters. The production of Ni supported catalysts ($\gamma$-$Al_2O_3$) has been described e.g. in the dissertation by M. G. Nijkamp, Universiteit Utrecht, NL, 2002 "Hydrogen Storage using Physisorption Modified Carbon Nanofibers and Related Materials". Ni-based systems are also described by Shaikhutdinov et al. (Shamil' K. Shaikhutdinov, L. B. Avdeeva, O. V. Goncharova, D. I. Kochubey, B. N. Novgorodov, L. M. Plyasova, "Coprecipitated Ni—Al and Ni—Cu—Al catalysts for methane decomposition and carbon deposition I.", Applied Catalysis A: General, 126, 1995, pages 125-139) as active in the decomposition of methane to carbon nanomaterials. These catalysts were produced by a discontinuous precipitation.

Catalyst systems with a high level of catalytically active metal components—up to 100 wt. %—with at the same time extremely low diameters of the metalite centres, have recently been developed to maximise the space-time yield. Catalysts of this type are the "full contacts" generally known to the skilled person. A catalyst of this type is disclosed in DE-A 10 2004 054 959. This catalyst produced discontinuously in a stirred tank by coprecipitation of the corresponding metal salts is distinguished by a high productivity. The carbon nanotubes produced, however, have a very broad distribution of the geometric measurements (for example, external diameter: from 5 to approx. 40 nm). The reason for this is probably to be found in the effect on the catalyst properties by conditions during discontinuous precipitation. Discontinuous precipitation in a stirred tank has the disadvantage that microbe formation and microbe growth takes place during the entire addition of the precipitation agent. A catalyst which has a broad size distribution of the primary particles and at the same time a broad distribution of the catalytically active metalite centres which leads to carbon nanotubes with a broad distribution of the geometric measurements (for example distribution of inner/outer diameter, number of carbon layers, length of the carbon nanotubes, layer arrangement etc.) is obtained by this method. This distribution has a crucial effect on the application properties—dispersion in polymers, electrical and mechanical properties etc.—and consequently the commercial use of the carbon nanotubes. Consequently it is clear that apart from the high productivity, an extremely narrow distribution of the catalytically active metalite centres have a crucial industrial importance.

In principle, the catalysts used as prior art have the disadvantage that they have too low a productivity and/or the carbon nanotubes formed therefrom have too broad a distribution of the geometric measurements.

The object of the present invention was therefore, based on the prior art, to provide a catalyst which is distinguished by a high space-time yield and by a narrow distribution of the geometric measurements of the multi-layer carbon nanotubes produced in the catalytic decomposition of carbon-containing educt gases.

SUMMARY OF THE INVENTION

It was surprisingly found that this object is resolved by a continuous process for the production of catalysts by continuous precipitation of metal salt solutions.

Surprisingly it was shown that the continuous production of catalysts by precipitation from metal salt solutions gives a catalyst with which the heterogeneously catalysed deposition of carbon tubes with high yield based on the catalyst mass used is successful, with very good quality and high graphite level, these carbon tubes at the same time having a very narrow distribution of the geometric dimensions. This distribution is clearly narrower than with comparable discontinuously produced catalysts. Because of the narrow distribution of the geometric dimensions, carbon nanotubes produced in this way have clearly better application properties such as dispersibility, electrical conductivity, percolation limit etc. Precipitation by blending a metal salt solution with a precipitation agent using components or apparatus such as for example static mixers, micromixers, valve mixers, (micro) nozzles etc has proved an advantage.

The simple increase in scale by "numbering up" or "scaling up" can be named as a further advantage of the process according to the invention. In contrast to this, increasing the scale of a discontinuous precipitation synthesis of a catalyst proves very difficult because of the reaction conditions changing with the scale (solution proportions, power feed, stirrer, flow proportions etc.). That is, the expenditure in the implementation establishment of a continuous precipitation synthesis is clearly lower than in a discontinuous precipitation. In addition, the continuous operation, because of constant precipitation conditions, causes an improved constancy of the catalyst quality and consequently also a more constant quality of the carbon nanotubes.

DETAILED DESCRIPTION

The process according to the invention can be used for the continuous production of CCVD catalysts based on the corresponding transition metals known in the prior art, the only restriction being the requirement to form a homogeneous solution in the form of the corresponding metal salt solution.

The subject matter of the present invention is therefore a process for the continuous production of catalysts for the formation of carbon nanotubes, comprising the continuous addition of at least one metal salt solution in a device in which conditions prevail which lead to a precipitation of the catalyst, and the continuous removal of the catalyst formed by precipitation.

The metal salt solution contains in dissolved form at least one metal that catalyses the formation of carbon nanotubes. Suitable catalytically active metals are for example all transition metals. Examples of particularly suitable catalytically active metals are Fe, Ni, Cu, W, V, Cr, Sn, Co, Mn and Mo. Very particularly suitable catalytically active metals are Co, Mn and Mo.

Optionally an addition of at least one other component which either forms a support material in other steps of the catalyst treatment or together with the transition metals forms a catalytically active mixed compound, is carried out.

Various starting compounds can be used, provided they are soluble in the solvent used, i.e. in the case of coprecipitation can also be jointly precipitated. Examples of these starting compounds are acetates, nitrates, chlorides and other soluble compounds.

Preferred solvents are short-chain ($C_1$ to $C_6$) alcohols, such as for example methanol, ethanol, n-propanol, i-propanol or butanol and water and mixtures thereof. Aqueous synthesis routes are particularly preferred.

Precipitation can be caused e.g. by a change in the temperature, the concentration (also by evaporation of the solvent), by a change in the pH and/or by the addition of a precipitation agent or combinations thereof.

Examples of suitable precipitation agents are solutions of ammonium carbonate, ammonium hydroxide urea, alkali or alkaline earth carbonates and alkali or alkaline earth hydroxides in the afore-mentioned solvents.

Precipitation is carried out continuously. The metal salt solution and optionally the precipitation reagent and other components are mixed by means of conveyor apparatus in a mixing unit at high mixing intensity. Static mixers, Y-mixers, multi-lamination mixers, valve mixers, micro-mixers, (two-component) nozzle mixers and other similar mixers known to the skilled person are preferred.

Surface-active substances (e.g. ionic or nonionic surfactants or carboxylic acids) can be added to improve the precipitation behaviour and to modify the surface of the solids produced.

A coprecipitation of the components forming the catalyst, in particular consisting of aqueous solution, e.g. with addition of ammonium carbonate, ammonium hydroxide, urea, alkali carbonates and hydroxides as precipitation reagent, is advantageous and therefore preferred.

The process according to the invention comprises in a preferred embodiment a continuous coprecipitation of the catalytically active metal compounds together with at least one other component which in other steps of the catalyst treatment forms either a support material or a catalytically active mixed compound. Al, Mg, Si, Zr, Ti, etc. or common mixed metal oxide-forming elements known to the skilled person can be named as examples of other components of this type. The content of the other components can be between 1 and 99 wt. % based on the total catalyst weight. The catalysts according to the invention preferably have a level of other components of 5-95 wt. %.

The catalyst occurring in the form of a solid can be separated from the educt solutions according to methods known to the skilled person such as e.g. filtering, centrifuging, evaporating and concentrating. Centrifuging and filtration are preferred. The solid obtained can be further washed or further used directly, as obtained. The catalyst obtained can be dried for improved ease of handling. As known with heterogeneous catalysts, further conditioning of the catalysts can be of advantage. This conditioning can be calcination and thermal treatment and treatment with reactive atmospheres or e.g. water vapour with the aim of improving the catalytic properties. A thermal pre-treatment in oxidising atmosphere at temperatures between 300° C. and 900° C. is preferred. Conditioning upstream or downstream can be shaping and/or grading. In certain cases, pre-treatment of the catalyst to be used industrially with a reactive gas such as e.g. $H_2$, hydrocarbons, CO or with mixtures of the named gases can be of advantage. The metal compounds contained can be changed in their oxidation state by means of such a treatment, but the morphology of the catalyst structure is also affected. Direct use of the catalyst, a reductive pre-treatment or else the entire or partial conversion of the catalytically active substances to the corresponding carbides is preferred.

The catalyst obtained according to the process according to the invention forms a further subject matter of the present invention.

A preferred transition metal combination is based on the components manganese and cobalt, optionally with addition of molybdenum. In addition to these components, the addition of one or more metal components can be considered. Examples of these are all transition metals, preferably metal components based on the elements Fe, Ni, Cu, W, V, Cr or Sn.

The catalyst obtained in accordance with the process according to the invention contains preferably 2-98 mol. % Mn and 2-98 mol. % Co based on the content of active components in metal form. A content of 10-90 mol. % Mn and 10-90 mol. % Co is particularly preferred, a content of 25-75 mol. % Mn and 25-75 mol. % Co is particularly preferred. The sum of the levels of Mn and Co, or Mn, Co and Mo is not thereby inevitably 100% if other elements as mentioned above are added. An addition of 0.2-50% of one or more other metal components is preferred. For example, Mo in the range of 0-10 mol. % molybdenum can be added.

Catalysts which have similar contents by weight of Mn and Co are particularly preferred. A ratio of Mn/Co of 2:1 to 1:2, particularly preferably 1.5:1 to 1:1.5, is particularly preferred.

Another preferred embodiment of the continuously produced catalyst according to the invention contains preferably 2-98 mol. % Fe and 2-98 mol. % Mo based on the content of active components in metal form. A content of 5-90 mol. % Fe and 2-90 mol. % Mo is particularly preferred, a content of 7-80 mol. % Fe and 2-75 mol. % Mo is particularly preferred. The sum of the levels of Fe and Mo is thereby not inevitably 100% if other elements as named above are added. An addition of 0.2-50% of one or more other metal components is preferred.

A further subject matter of the present invention is the production of carbon nanotubes using the catalyst according to the invention.

The production of carbon nanotubes can be carried out in various types of reactor. For example, fixed bed reactors, tubular reactors, rotating tubular reactors, moving bed reactors, reactors with a bubble-forming, turbulent or irradiated fluidised bed, internally or externally circulating fluidised beds, can be named here as examples. It is also possible to feed the catalyst into a reactor filled with particles which comes for example under the above-named classes. These particles can be inert particles and/or consist totally or partially of another catalytically active material. These particles can also be agglomerates of carbon nanotubes. The process can be carried out for example continuously or discontinuously, continuously or discontinuously referring both to the feed of the catalyst and to the removal of the carbon nanotubes formed with the spent catalyst.

Light hydrocarbons such as aliphatics and olefins are considered as educts. Alcohols, carbon oxides, in particular CO, aromatic compounds with and without heteroatoms and functionalised hydrocarbons such as e.g. aldehydes or ketones, however, can also be used provided they are decomposed on the catalyst. Mixtures of the above-named hydrocarbons can also be used. In particular e.g. methane, ethane, propane, butane or higher aliphatics, ethylene, propylene, butene, butadiene or higher olefins or aromatic hydrocarbons or carbon oxides or alcohols or hydrocarbons with heteroatoms are suitable. Short- and medium-chain aliphatic or one- or two-nucleus aromatic hydrocarbons are preferably used. Aliphatics ($C_xH_{2x+2}$) and olefins ($C_xH_y$) with a C number x of x=1-4 are preferably used.

The carbon-releasing educt can be fed in gaseous form or be evaporated in the reaction chamber or a suitable upstream apparatus. Hydrogen or an inert gas, for example noble gases or nitrogen, can be added to the educt gas. It is possible to carry out the process according to the invention for the production of carbon nanotubes with addition of an inert gas or a mixture of several inert gases with and without hydrogen in any combination. The reaction gas preferably consists of carbon support, hydrogen and optionally of an inert component to set advantageous reactant partial pressures. The addition of a component, inert in the reaction, as internal standard for analysis of the educt gas or product gas or as a detection aid in monitoring of the process, is also conceivable.

Production can take place at pressures above and below atmospheric pressure. The process can be carried out at pressures of 0.05 bar to 200 bar; pressures of 0.1 to 100 bar are preferred, pressures of 0.2 to 10 bar are particularly preferred. The temperature can be varied in the temperature range of 300° C. to 1600° C. It must, however, be high enough that the deposition of carbon by decomposition at sufficient speed takes place and may not lead to a clear autopyrolysis of the hydrocarbon in the gas phase. This would lead to a high level of not preferred amorphous carbon in the resulting material. The advantageous temperature range is between 500° C. and 800° C. A decomposition temperature of 550° C. to 750° C. is preferred.

The catalyst can be passed into the reaction chamber batchwise or continuously. The catalyst can be reduced before introduction into the actual reaction chamber as described, added in an oxidic form of the catalytically active metals or even in the form of the precipitated hydroxides or carbonates.

The carbon nanotubes produced in this way can mostly be used, because of the low catalyst content in the end product, without previous processing. Optionally the materials can be purified, e.g. by chemically dissolving the catalyst residues and support residues, by oxidation of the levels of amorphous carbon formed in very small quantities or by a thermal post-treatment in an inert or reactive gas. It is possible to chemically functionalise the carbon nanotubes produced to obtain e.g. improved binding into a matrix or to adapt the surface properties specifically to the desired application.

The carbon nanotubes produced according to the invention are suitable for use as additives in polymers, in particular for mechanical reinforcement and for increasing the electrical conductivity. The carbon nanotubes produced can further be used as material for gas and energy storage, for colouring and as flame retardants. Because of the good electrical conductivity, the carbon nanotubes produced according to the invention can be used as electrode material or for the production of strip conductors and conductive structures. It is also possible to use the carbon nanotubes produced according to the invention as emitters in displays. The carbon nanotubes are preferably used in polymer composite materials, ceramic or metal composite materials to improve the electrical or thermal conductivity and mechanical properties, to produce conductive coatings and composite materials, as a dye, in batteries, condensers, displays (e.g. flat screen displays) or illuminants, as field effect transistors, as a storage medium e.g. for hydrogen or lithium, in membranes, e.g. for purifying gases, as a catalyst or as a support material e.g. for catalytically active components in chemical reactions, in fuel cells, in the medical sector, e.g. as a framework for the growth control of cell tissue, in the diagnostic sector e.g. as markers, and in chemical and physical analysis (e.g. in scanning microscopes).

The process according to the invention and the catalysts according to the invention are illustrated in the following by means of a few/examples, but the examples are not to be understood as restrictions to the inventive ideas.

EXAMPLES

Example 1

Production of the Catalysts

Catalyst 1: Four solutions of 863.4 g $Co(NO_3)_2*6H_2O$ in 1439 ml deionised water, 736.8 g $Mn(NO_3)_2*4H_2O$ in 1439 ml deionised water, 264.8 g $Al(NO_3)_3*9H_2O$ in 575.6 ml deionised water and 230.2 g $Mg(NO_3)_2*6H_2O$ in 431.7 ml deionised water were produced. The Mn- and Co-containing solutions and the Al- and Mg-containing solutions were combined and stirred for 5 min at room temperature. The two solutions obtained were then likewise combined and stirred for 5 min. Traces of cloudiness present were dissolved by dropwise addition of dilute $HNO_3$. The solution obtained in this way was thereafter referred to as solution A. A solution referred to in the following as solution B was produced by stirring 544.3 g NaOH into 2099.3 ml deionised water. Both solutions A and B were passed at room temperature by means of pumps through a valve mixer so that continuous blending was ensured. The suspension strand produced was collected with stirring in a container with a quantity of approx. 500 ml deionised water, the pH being maintained at pH=10. The volume flows of solutions A and B were 2.8 L/h and approx. 1.5 L/h. The volume flow of solution B was continuously regulated to ensure a constant pH. The solid obtained in this way was filtered and then washed NaOH free by a displacement wash. The filter cake was dried overnight at 180° C. in air and then calcined at 400° C. in air for 4 h. After calcination, 550 g of a black solid were obtained. The theoretical ratio of the components used is Mn:Co:$Al_2O_3$:MgO=36:39:16:8.

Catalyst 2: Four solutions of 947.3 g $Co(NO_3)_2$*$6H_2O$ in 2441.4 ml deionised water, 830.1 g $Mn(NO_3)_2$*$4H_2O$ in 2441.4 ml deionised water, 1757.8 g $Al(NO_3)_3$*$9H_2O$ in 1709 ml deionised water and 1494.1 g $Mg(NO_3)_2$*$6H_2O$ in 1709 ml deionised water were produced. The Mn- and Co-containing solutions and the Al- and Mg-containing solutions were combined and stirred for 5 min at room temperature. The two solutions obtained were then likewise combined and stirred for 5 min. Traces of cloudiness present were dissolved by dropwise addition of dilute $HNO_3$. The solution obtained in this way was thereafter referred to as solution A. A solution referred to in the following as solution B was produced by stirring 1464.8 g NaOH into 4882.8 ml deionised water. Both solutions A and B were passed at room temperature by means of pumps through a valve mixer so that an intensive continuous blending was ensured. The suspension strand produced was collected with stirring in a container with a quantity of approx. 500 ml deionised water, the pH being maintained at pH=10. The volume flow of solution A was 2.8 L/h. The volume flow of solution B was continuously adapted to ensure a constant pH. The solid obtained in this way was filtered and then washed NaOH free by a displacement wash. The filter cake was dried overnight at 180° C. in air and then calcined at 400° C. in air for 4 h. After calcination, 1046.9 g of a black solid were obtained. The theoretical ratio of the components used is Mn:Co:$Al_2O_3$:MgO=17:18:44:22.

Catalyst 3: Three solutions of 467.5 g $Co(NO_3)_2$*$6H_2O$ in 810 ml deionised water, 395.6 g $Mn(NO_3)_2$*$4H_2O$ in 810 ml deionised water and 1890 g $Mg(NO_3)_2$*$6H_2O$ in 1620 ml deionised water were produced. The Mn- and Co-containing solutions were combined and stirred for 5 min at room temperature. This solution was then likewise combined with the Mg-containing solution and stirred for 5 min. Traces of cloudiness present were dissolved by dropwise addition of dilute $HNO_3$. The solution obtained in this way was thereafter referred to as solution A. A solution referred to in the following as solution B was produced by stirring 1212 g NaOH into 10800 ml deionised water. Both solutions A and B were passed at room temperature by means of pumps through a valve mixer so that an intensive continuous blending was ensured. The suspension strand obtained was collected with stirring in a container with a quantity of approx. 500 ml deionised water, the pH being maintained at pH=10. The volume flow of solution A was 2.8 L/h. The volume flow of solution B was continuously adapted to ensure a constant pH. The solid obtained in this way was filtered and then washed NaOH free by a displacement wash. The filter cake was dried overnight at 180° C. in air and then calcined at 400° C. in air for 4 h. After calcination, 569.9 g of a black solid were obtained. The theoretical ratio of the components used is Mn:Co:MgO=18:20:62.

Catalyst 4: Three solutions of 71.6 g $(NH_4)_6Mo_7O_{24}$*$4H_2O$ in 1431.8 ml deionised water, 1403.2 g $Fe(NO_3)_3$*$9H_2O$ in 1431.8 ml deionised water and 1403.2 g $Al(NO_3)_3$*$9H_2O$ in 933.6 ml deionised water were produced. The Mo- and Fe-containing solutions were combined and stirred for 5 min at room temperature. The solution obtained in this way was then combined with the Al-containing solution and stirred for 5 min. Traces of cloudiness present were dissolved by dropwise addition of dilute $HNO_3$. The solution obtained in this way was thereafter referred to as solution A. A solution referred to in the following as solution B was produced by stirring 2004.6 g $(NH_4)_2CO_3$ into 6013.7 ml deionised water. Both solutions A and B were passed at room temperature by means of pumps through a valve mixer so that an intensive continuous blending was ensured. The suspension strand produced was collected with stirring in a container with a quantity of approx. 500 ml deionised water, the pH being maintained at pH=6. The volume flow of solution A was 2.6 L/h. The volume flow of solution B was continuously adapted to ensure a constant pH. The solid obtained in this way was filtered and then washed $NH_3$ free by a displacement wash. The filter cake was dried overnight at 180° C. in air and then calcined at 400° C. in air for 4 h. After calcination, 503.4 g of a black solid were obtained. The theoretical ratio of the components used is Fe:Mo:$Al_2O_3$=32:6:62.

Catalyst 5: A solution of 1689.6 g $Fe(NO_3)_3$*$9H_2O$ in 1431.8 ml deionised water and 1403.2 g $Al(NO_3)_3$*$9H_2O$ in 933.6 ml deionised water was produced. The Fe solution and the Al solution were combined and stirred for 5 min at room temperature. Traces of cloudiness present were dissolved by dropwise addition of dilute $HNO_3$. The solution obtained in this way was thereafter referred to as solution A. A solution referred to in the following as solution B was produced by stirring 2004.6 g $(NH_4)_2CO_3$ into 6013.7 ml deionised water. Both solutions A and B were passed at room temperature by means of pumps through a valve mixer so that an intensive continuous blending was ensured. The suspension strand produced was collected with stirring in a container with a quantity of approx. 500 ml deionised water, the pH being maintained at pH=6. The volume flow of solution A was 2.6 L/h. The volume flow of solution B was continuously adapted to ensure a constant pH. The solid obtained in this way was filtered and then washed $NH_3$ free with a displacement wash. The filter cake was dried overnight at 180° C. in air and then calcined at 400° C. in air for 4 h. After calcination, 527.4 g of a black solid were obtained. The theoretical ratio of the components used is Fe:$Al_2O_3$=38:62.

Example 2

Production of Carbon Nanotubes

The catalysts produced in example 1 were tested in a fixed bed apparatus at laboratory scale. For this, a defined quantity of catalyst was placed in a quartz tube with an internal diameter of 9 mm, heated from outside by a heat carrier. The temperature of the solid beds was regulated by a PID control of the electrically heated heat carrier. The temperature of the catalyst bed and the catalyst/nanotubes mixture was determined by a thermoelement surrounded by an inert quartz capillary. Educt gases and inert diluent gases were led into the reactor via electronically controlled mass flow controllers. The catalyst samples were first of all heated in a stream consisting of hydrogen and inert gas. After reaching the desired temperature, the educt gas was connected. The volume ratio of the educt gas mixture was ethene:H2:Ar=45:60:5. The total volume flow was set at 110 mLN·min-1. The addition of the educt gases to the catalyst took place for a period of 100-120 minutes as a rule until the catalyst was completely deactivated. The quantity of deposited carbon was then determined by weighing. The structure and morphology of the deposited carbon was determined using SEM and TEM analysis. The quantity of deposited carbon with regard to catalyst used, hereafter referred to as yield, was defined on the basis of the mass of catalyst after calcination (mcat,0) and the increase in weight after reaction (mtotal−mcat,0): yield= (mtotal−mcat,0)/mcat,0. Examples illustrating the invention are given in the following. It can be seen that catalysts based on Mn—Co—Mo—Al—Mg compounds give a high yield.

TABLE 1

Overview of trials to test catalysts in a fixed bed apparatus

| | Composition | Heating in | Heating time, min | Reaction temperature, °C. | Reaction gas | Reaction time, min | Yield $g_{CNT}/g_{cat,0}$ | Formation MWNT |
|---|---|---|---|---|---|---|---|---|
| Catalyst 1 | Mn:Co:Al$_2$O$_3$:MgO 36:39:16:8 | H$_2$:N$_2$ 1:1 | 63 | 650 | C$_2$H$_4$:H$_2$ 56.8:43.2 | 120 | 88.2 | Yes |
| Catalyst 2 | Mn:Co:Al$_2$O$_3$:MgO 17:18:44:22 | H$_2$:N$_2$ 1:1 | 66 | 650 | C$_2$H$_4$:H$_2$ 53.0:47.0 | 120 | 38.2 | Yes |
| Catalyst 3 | Mn:Co:MgO 18:20:62 | H$_2$:N$_2$ 1:1 | 68 | 650 | C$_2$H$_4$:H$_2$ 54.4:45.6 | 121 | 19.7 | Yes |
| Catalyst 4 | Fe:Mo:Al$_2$O$_3$ 32:6:62 | H$_2$:N$_2$ 1:1 | 75 | 650 | C$_2$H$_4$:H$_2$ 54.6:45.4 | 120 | 24.8 | Yes |
| Catalyst 5 | Fe:Al$_2$O$_3$ 38:62 | H$_2$:N$_2$ 1:1 | 71 | 650 | C$_2$H$_4$:H$_2$ 53.0:47.0 | 120 | 7.7 | Yes |

Example 3

Catalyst Production not According to the Invention (Discontinuous)

Catalyst 6: Four solutions of 192.5 g Co(NO$_3$)$_2$*6H$_2$O in 250 ml deionised water, 166 g Mn(NO$_3$)$_2$*4H$_2$O in 250 ml deionised water, 60 g Al(NO$_3$)$_3$*9H$_2$O in 175 ml deionised water and 51 g Mg(NO$_3$)$_2$*6H$_2$O in 175 ml deionised water were produced. The Mn and Co-containing solution and the Al- and Mg-containing solution were combined and stirred for 5 min at room temperature. The two solutions obtained were then likewise combined and stirred for 5 min. Possible cloudiness present was dissolved by dropwise addition of dilute HNO$_3$. The solution obtained in this way was thereafter referred to as solution A. A solution referred to in the following as solution B was produced by stirring 300 g NaOH into 1000 ml deionised water. Both solutions A and B were added dropwise at room temperature with intensive stirring to a multi-necked round-bottom flask with a quantity of 200 ml deionised water, the pH being maintained at pH=10. After metering it was again stirred for a further 5 min and the solid obtained filtered. The solid was suspended twice in water and dispersed by stirring for 5 min and filtered. The filter cake was dried overnight at 180° C. in air and then calcined at 400° C. in air for 4 h. After calcination, 120 g of a black solid were obtained. The theoretical ratio of the components used is Mn:Co:Mo:Al$_2$O$_3$:MgO=36:39:16:8.

Catalyst 7: Four solutions of 19.4 g Co(NO$_3$)$_2$*6H$_2$O in 50 ml deionised water, 17 g Mn(NO$_3$)$_2$*4H$_2$O in 50 ml deionised water, 36 g Al(NO$_3$)$_3$*9H$_2$O in 35 ml deionised water and 30.6 g Mg(NO$_3$)$_2$*6H$_2$O in 50 ml deionised water were produced. The Mn- and Co-containing solution and the Al- and Mg-containing solution were combined and stirred for 5 min at room temperature. The two solutions obtained were then likewise combined and stirred for 5 min. Possible cloudiness present was dissolved by dropwise addition of dilute HNO$_3$. The solution obtained in this way was thereafter referred to as solution A. A solution referred to in the following as solution B was produced by stirring 60 g NaOH into 200 ml deionised water. Both solutions A and B were added dropwise at room temperature with intensive stirring to a multi-necked round-bottom flask with a quantity of 200 ml deionised water, the pH being maintained at pH=10. After metering it was again stirred for a further 5 min and the solid obtained filtered. The solid was suspended twice in water and dispersed by stirring for 5 min and filtered. The filter cake was dried overnight at 180° C. in air and then calcined at 400° C. in air for 4 h. After calcination, 20.5 g of a black solid were obtained. The theoretical ratio of the components used is Mn:Co:Mo:Al$_2$O$_3$:MgO=17:18:44:22.

Catalyst 8: Three solutions of 2.5 g (NH$_4$)$_6$Mo$_7$O$_{24}$*4H$_2$O in 50 ml deionised water, 49 g Fe(NO$_3$)$_3$*9H$_2$O in 50 ml deionised water and 49 g Al(NO$_3$)$_3$*9H$_2$O in 35 ml deionised water were produced. The Mo- and Fe-containing solutions were combined and stirred for 5 min at room temperature. The solution obtained in this way was then combined with the Al-containing solution and stirred for 5 min. Possible cloudiness present was dissolved by dropwise addition of dilute HNO$_3$. The solution obtained in this way was thereafter referred to as solution A. A solution referred to in the following as solution B was produced by stirring 70 g (NH$_4$)$_2$CO$_3$ into 225 ml deionised water. Both solutions A and B were added dropwise at room temperature with intensive stirring to a multi-necked round-bottom flask with a quantity of 1000 ml deionised water, the pH being maintained at pH=6. After metering it was again stirred for a further 5 min and the solid obtained filtered. The solid was suspended twice in water and dispersed by stirring for 5 min and filtered. The filter cake was dried overnight at 180° C. in air and then calcined at 400° C. in air for 4 h. After calcination, 20.9 g of a black solid were obtained. The theoretical ratio of the components used is Fe:Mo:Al$_2$O$_3$=32:6:62.

Example 4

Production of Carbon Nanotubes with Catalyst not According to the Invention

The catalysts obtained in example 3 were likewise tested in the laboratory apparatus as described in example 2. The yields of carbon nanotubes achieved are shown in Table 2. The yields of "batch" catalysts produced there under comparable conditions are of comparable size to the continuous catalysts. The distribution of the geometric parameters (inner and outer diameter of the carbon nanotubes) of the carbon nanotubes produced with "batch" catalyst is however clearly broader than the carbon nanotubes produced with the continuous catalysts.

TABLE 2

Figure 1:
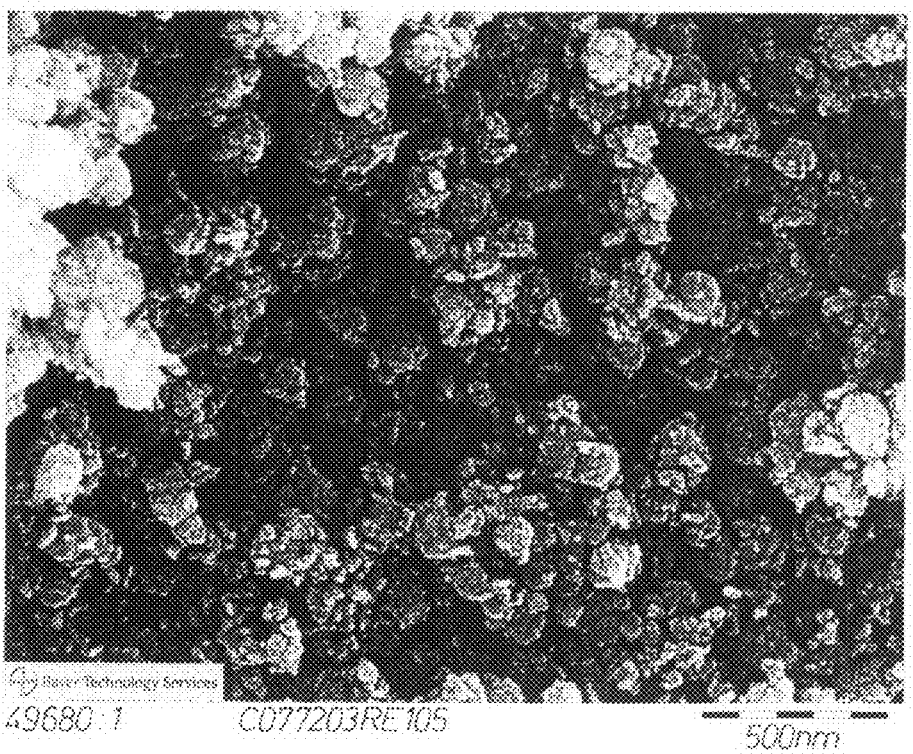
FIG. 1 shows a scanning electron micrograph of catalyst 1.
Figure 2:
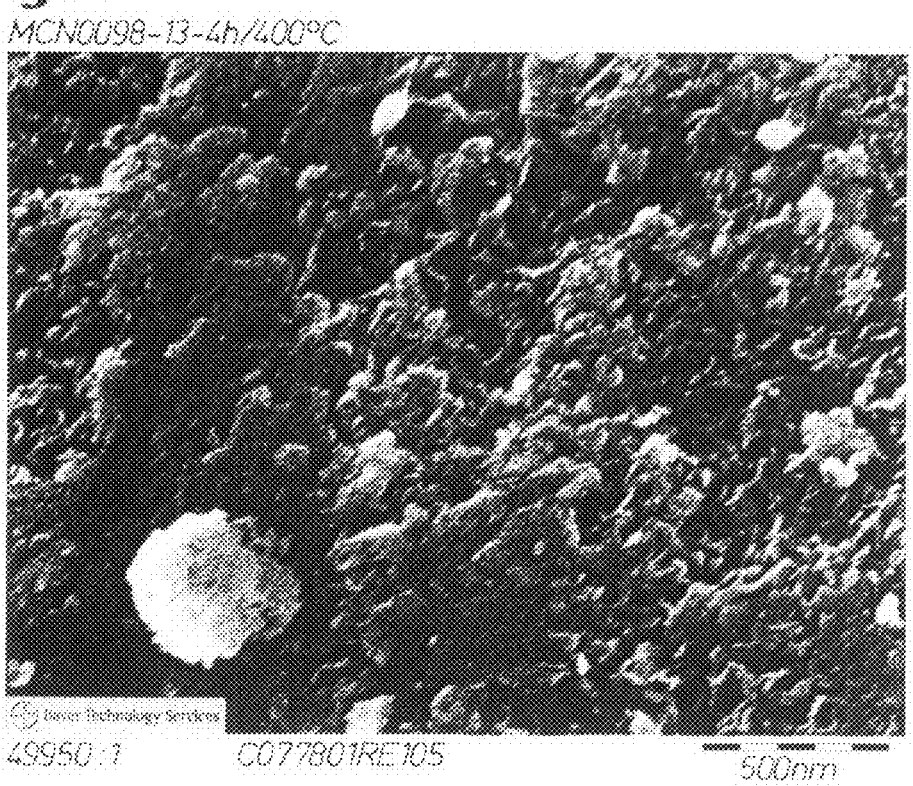
FIG. 2 shows a scanning electron micrograph of catalyst 2.
Figure 3:
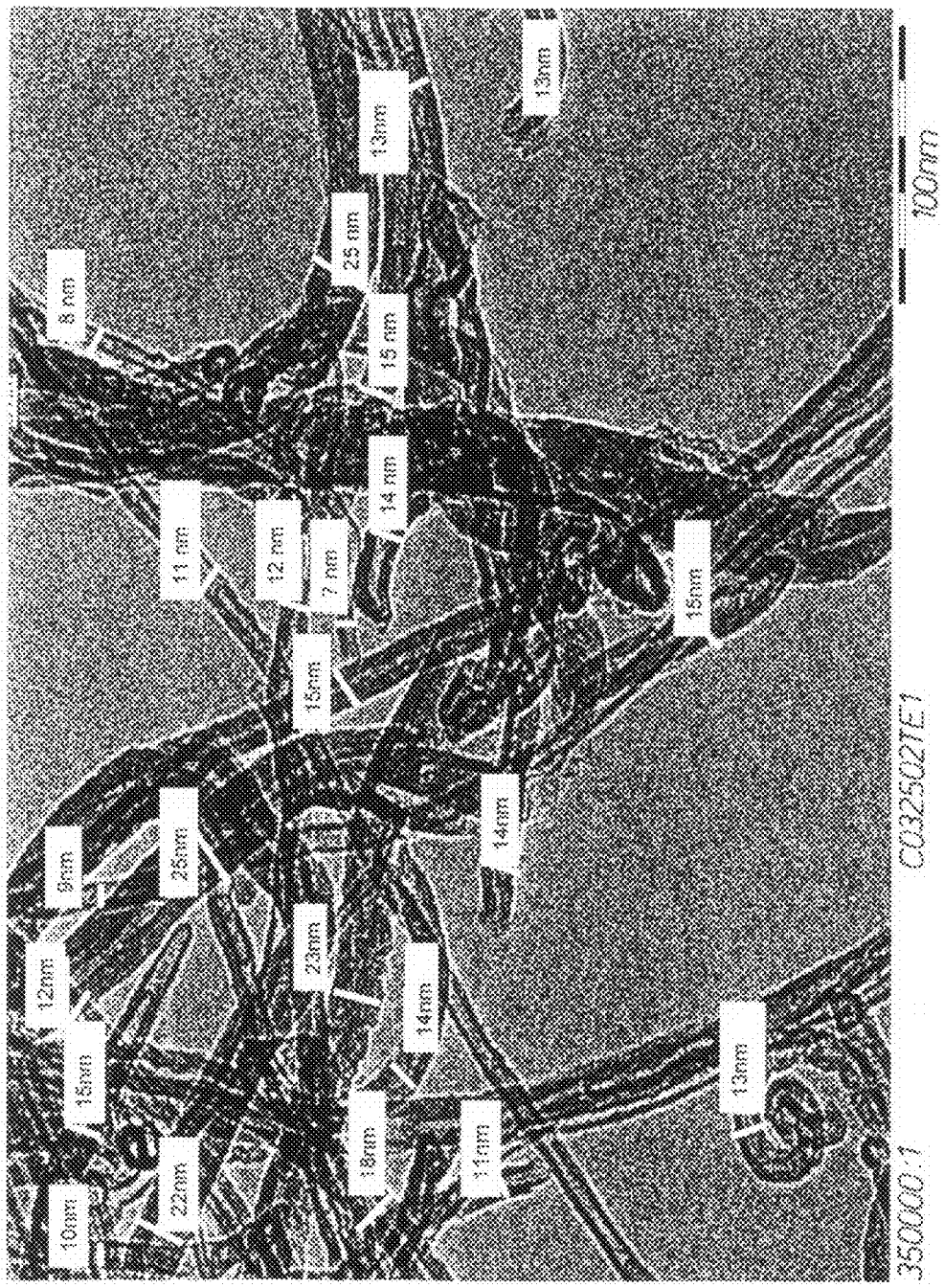
FIG. 3 shows a transmission electron micrograph of the carbon nanotubes produced with catalyst 1 (according to the invention).
Figure 4:
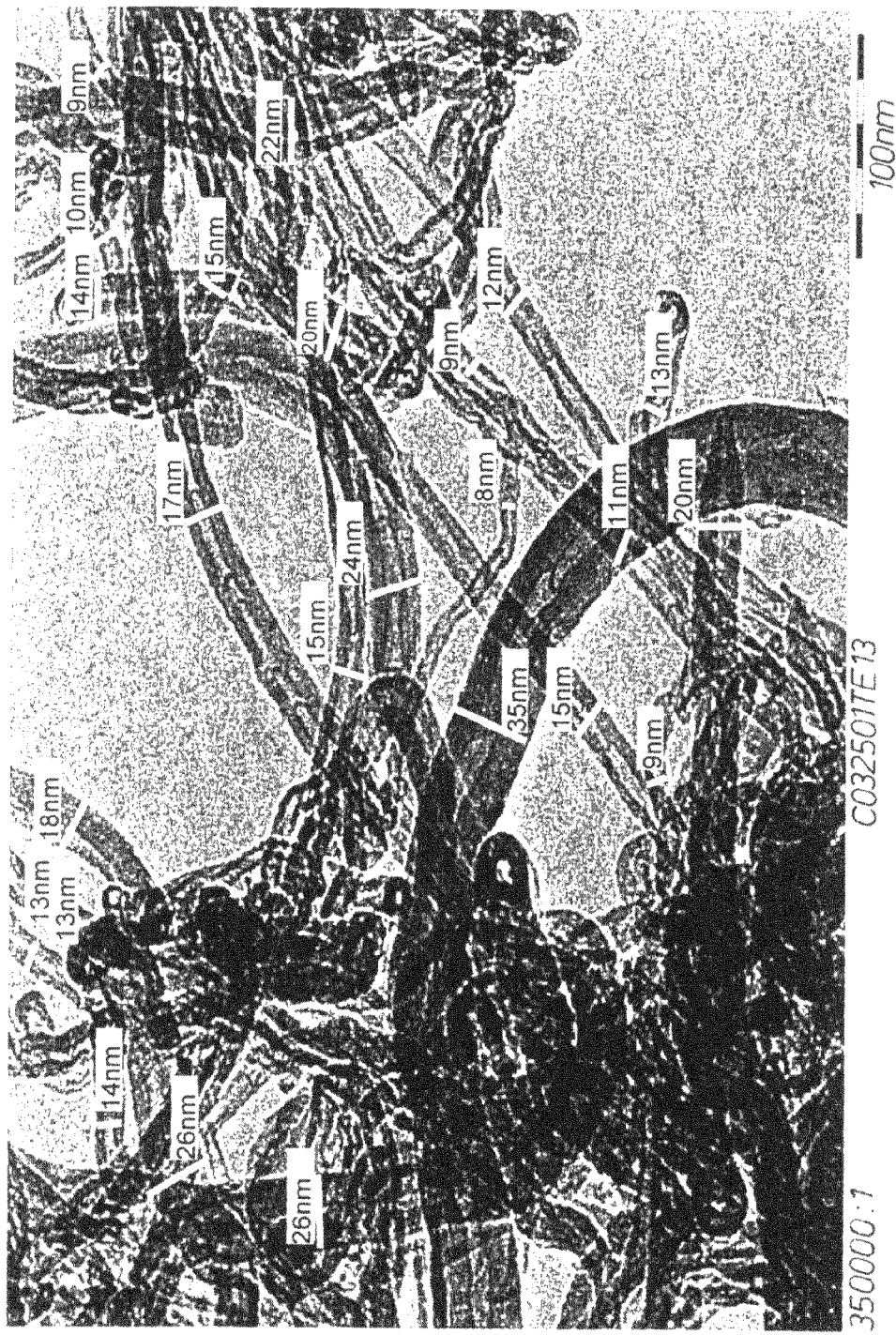
FIG. 4 shows a transmission electron micrograph of the carbon nanotubes produced with catalyst 6 (reference example).
Figure 5:
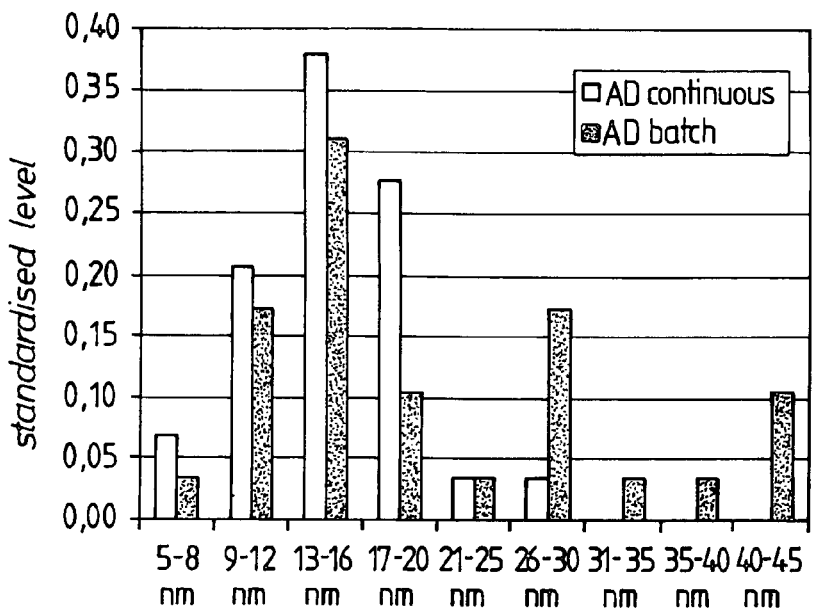
FIG. 5 shows a comparison of the outer diameter distribution between carbon nanotubes produced with catalyst 1 (according to the invention) and catalyst 6 (reference example).
Figure 6:
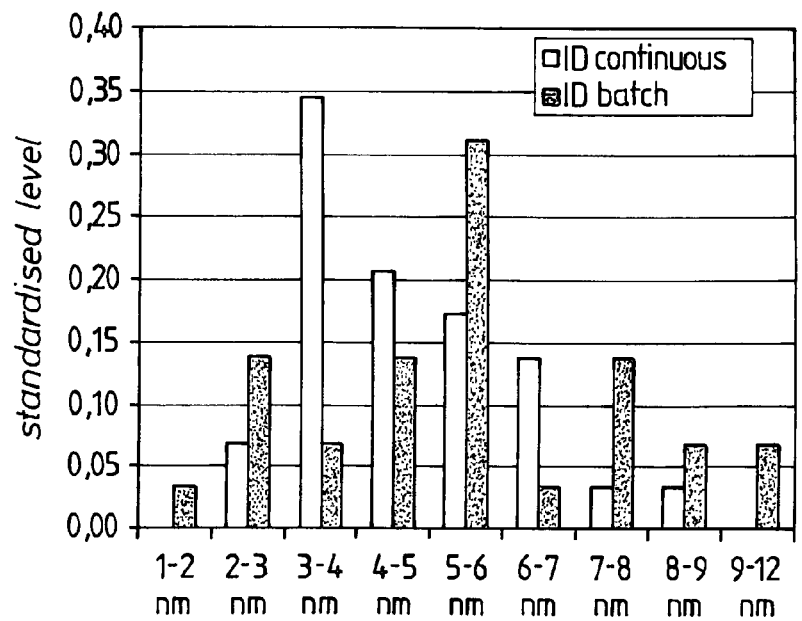
FIG. 6 shows a comparison of the inner diameter distribution between carbon nanotubes produced with catalyst 1 (according to the invention) and catalyst 6 (reference example).

Compilation of the test results for example 4 (counter example)

| | Composition | Heating in | Heating time, min | Reaction temperature, °C. | Reaction gas | Reaction time, min | Yield $g_{CNT}/g_{cat,0}$ | Formation MWNT |
|---|---|---|---|---|---|---|---|---|
| Catalyst 6 | Mn:Co:Al$_2$O$_3$:MgO 36:39:16:8 | H$_2$:N$_2$ = 1:1 | 96 | 650 | C$_2$H$_4$:H$_2$ 57.8:42.2 | 120 | 84.1 | Yes |
| Catalyst 7 | Mn:Co:Al$_2$O$_3$:MgO 17:18:44:22 | H$_2$:N$_2$ = 1:1 | 75 | 650 | C$_2$H$_4$:H$_2$ 59.4:40.6 | 111 | 62.3 | Yes |
| Catalyst 8 | Fe:Mo:Al$_2$O$_3$ 32:6:62 | H$_2$:N$_2$ = 1:1 | 69 | 650 | C$_2$H$_4$:H$_2$ 59.4:40.6 | 90 | 19.1 | Yes |

The invention claimed is:

1. Process for the continuous production of catalysts for the formation of carbon nanotubes with a narrow distribution of geometric measurements, comprising the continuous addition of at least one metal salt solution to a reactor in which conditions that lead to a precipitation of the catalyst prevail, and the continuous removal of the catalyst formed during precipitation, the conditions that lead to a precipitation of the catalyst being created by a change in the temperature, the concentration, the pH and/or by the addition of a precipitation agent, the metal salt solution and the precipitation agent being blended by means of a conveyor apparatus in a mixing unit with a high mixing intensity selected from the group consisting of valve mixers.

2. Process according to claim 1, wherein the conditions that lead to a precipitation of the catalyst are created by an addition of a precipitation agent selected from the group consisting of ammonium carbonate, ammonium hydroxide, urea, alkali or alkaline earth carbonates and alkali or alkaline earth hydroxides.

3. Process according to claim 1, wherein the metal salt solution contains at least one metal selected from the group consisting of Fe, Ni, Cu, W, V, Cr, Sn, Co, Mn and Mo.

4. Process according to claim 1, further comprising the continuous addition of a solution of another component which in other steps of the catalyst treatment forms a support material or a catalytic active mixed compound.

5. Process according to claim 4, wherein said other component contains Al, Mg, Si, Zr or Ti.

* * * * *